Figure 1:
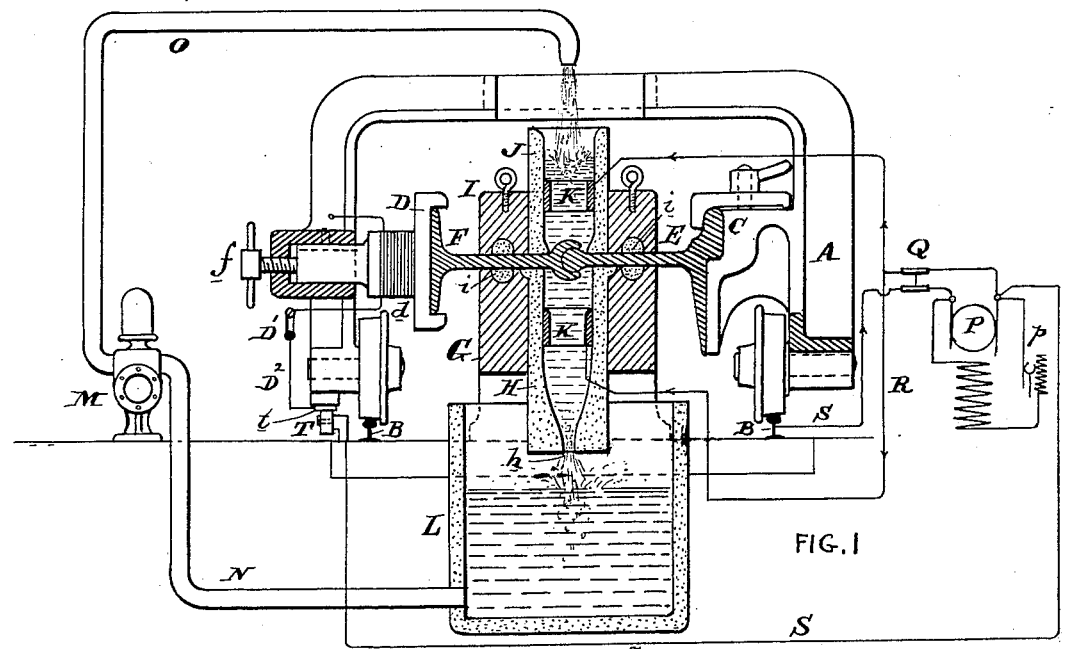

(No Model.)

R. M. HUNTER.
APPARATUS FOR ELECTRIC WELDING.

No. 520,360. Patented May 22, 1894.

Attest
H. L. Motherwell

Inventor

THE NATIONAL LITHOGRAPHING COMPANY,
WASHINGTON, D. C.

UNITED STATES PATENT OFFICE.

RUDOLPH M. HUNTER, OF PHILADELPHIA, PENNSYLVANIA, ASSIGNOR TO THE JOHNSON COMPANY, OF PENNSYLVANIA.

APPARATUS FOR ELECTRIC WELDING.

SPECIFICATION forming part of Letters Patent No. 520,360, dated May 22, 1894.

Application filed October 12, 1893. Serial No. 487,950. (No model.)

*To all whom it may concern:*

Be it known that I, RUDOLPH M. HUNTER, of the city and county of Philadelphia and State of Pennsylvania, have invented an Improvement in Apparatus for Electric Welding, of which the following is a specification.

My invention has reference to electric welding, and consists of certain improvements which are fully set forth in the following specification and shown in the accompanying drawings which form a part thereof.

This application, Case No. 267, has particular reference to apparatus for welding metal parts together, and is adapted to various manufactures. The particular construction shown as an example of the use of the apparatus is that in which it is used for the manufacture of steel rails wherein the feet or chairs are welded to the webs of the girder rail to give it additional height and a self supporting base. The rail construction is well known and has been manufactured by other methods of welding the two parts together, therefore in this application no claim is made to the rail proper.

In the processes heretofore used for electrically welding the feet to the web of a girder rail there has been employed apparatus in which the two parts were firmly gripped in suitable jaws, the parts pressed together, and an alternating current of great volume caused to pass through the parts in contact so as to cause the metal to fuse and weld together.

In carrying out my invention I bring the two parts of the metal to be welded in firm contact, and cause the said parts to be submerged in a liquid, preferably acidulated water, and while surrounded with the liquid, I pass an electric current from one or more electrodes in contact with the liquid through the metal parts to be united and back to the source of electrical energy, employing the liquid as a conductor for the current. In practice the positive current is delivered to the electrode or electrodes submerged in the liquid, and the negative current is delivered to the parts of the metal to be welded. The action of the current causes the decomposition of the liquid, generating gases adjacent to the metal parts in contact to be welded, and this produces such re-action that the portions of the metal in contact with the liquid become instantly brought to a welding heat. In this method of welding a considerably stronger current or one of greater tension should be used than in the alternating system before referred to, and the current is preferably continuous in its nature or what is known as a continuous current as distinguished from an alternating current. It might be a pulsating or intermittent current if desired. When the two parts of the metal in contact are fused or brought to a welding heat they instantly unite, forming an integral structure; and this joint may be further strengthened by having the parts which are welded subjected to pressure performed by hydraulic, gravity or steam devices as is evident to any one skilled in the art.

In the particular apparatus shown, I provide a traveling support or carriage for the girder rail proper, and suitable means are carried by the traveling support or carriage whereby the feet or chairs may be adjusted in position with respect to the girder rail while it is clamped or held on the carriage. At one place adjacent to the rails or bed upon which the carriage moves the joint between the foot portions and the girder rail is surrounded by a suitable hollow frame through which a liquid is caused to flow to submerge the parts in contact during the electric welding operation. After the welding has been performed, the liquid is run off, the hollow frame is separated, and the rail with its welded foot is moved along to be brought under a hammer or compression device. Simultaneously with the forging operation a second foot, previously held in position upon the rail, is brought into position so as to be held in the hollow frame and subjected in its turn to the welding operation. By this means the welding and forging or compression operations may be carried on simultaneously but successively with respect to a single part operated on.

My improvements will be better understood by reference to the accompanying drawings, in which—

Figure 2:
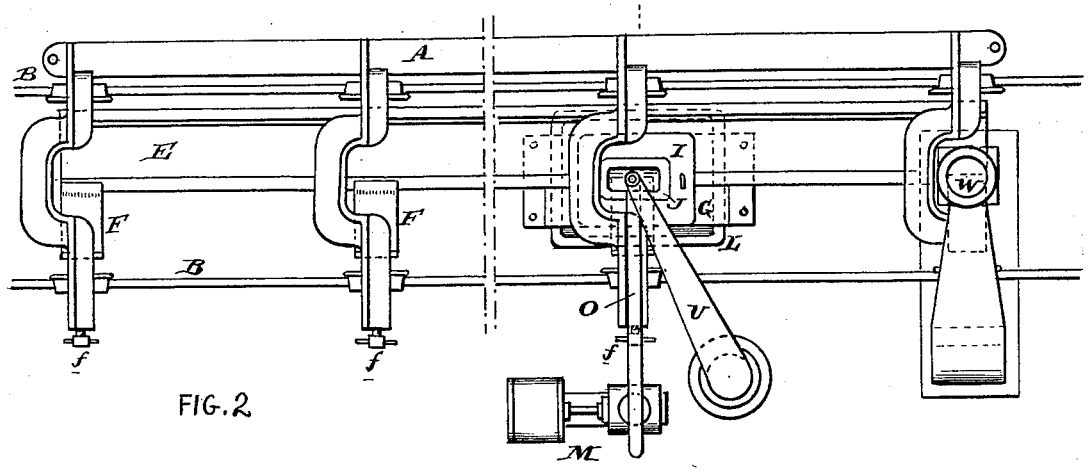
Figure 3:
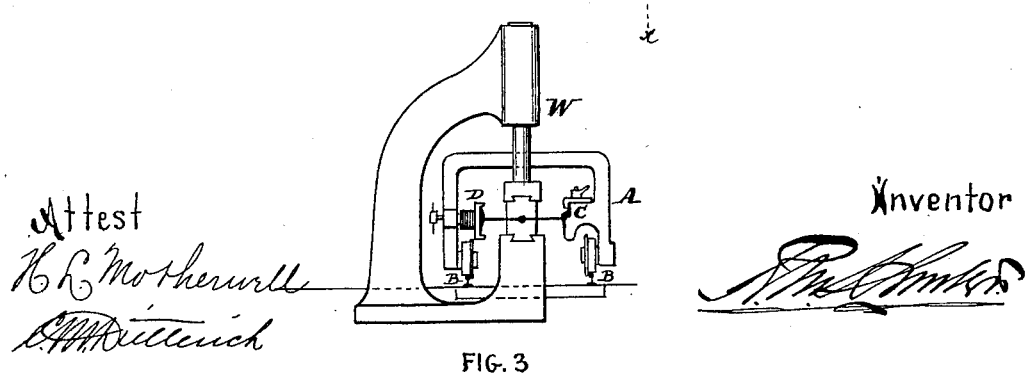

Figure 1 is a transverse section through the entire welding apparatus at a point corresponding to the hollow frame where the welding operation takes place. Fig. 2 is a plan view of my improved apparatus; and Fig. 3 is an end elevation at that portion adjacent to the forging or compression devices.

A is a carriage or movable frame or support of any suitable construction, and preferably runs upon a railway track B. This carriage A may be of a length equal to that of the rail section and is provided at intervals with suitable jaws or clamps C adapted to support the head of the rail as clearly indicated in Fig. 1, and at the same time permit the web of the rail to project out laterally. It is immaterial what form of jaw or clamp is employed to hold the rail to the carriage. The carriage at intervals is provided with an overhanging part furnished with guiding supports or jaws D for receiving the foot flanges of the feet F of the rail, and is further provided with a clamping screw F adapted to force the foot toward the web of the rail E so as to bring the feet and the web in close contact. The jaw D is movable on the carriage A, and is provided with a solenoid to magnetize it so as to hold the foot F in position. It thus forms an electric clamp. In practice the web of the rail is provided with a bulbous portion, and the upper part of the foot is provided with a curved or recessed portion adapted to fit upon the bulb portion as is clearly indicated in Fig. 1. It is quite evident that these parts may be reversed, that is to say, the bulbous portion might be upon the foot and the curved or recessed portion upon the web of the rail. Any other means of butting the two parts together may be employed without departing from the general structure of the invention. The carriage A is moved over the track B in any suitable well known manner such as by a windlass connected to it by a suitable chain, and the parts may be returned for the purpose of inserting a new rail after the completion of one complete series of welding operations by giving just enough inclination to the rails B to enable the carriage to run back by gravity. At one place along the line of the railway track B is a hollow frame formed of a lower vessel H and an upper vessel J, the vessel H resting upon an iron frame G extending up to the upper portion of the vessel H and forming a seat for the rail parts E and F. The vessels H and J are preferably made of glazed terra cotta or porcelain or of some substance which is non-conducting and at the same time not liable to be materially injured by the action of the welding operation. The upper vessel J is surrounded by a heavy iron case I adapted to fit upon the upper part of the frame G and with said frame to form heavy metallic jaws operating by gravity to hold the two parts of the rail in perfect alignment, and with the aid if desired, of plastic sealing substance $i$ in grooves in the adjacent faces of the parts G and I to form a liquid tight joint to prevent the lateral escape of the liquid when it rises to surround the portions of the rail in contact.

The vessel H is of a size in section corresponding in size substantially to the aperture in the upper vessel J, and is just large enough to surround the joint of the parts F and E of the rail. The vessel H is contracted at the bottom at $h$ to prevent too free escape of the liquid. Below the vessel H is a tank L for receiving the liquid.

M is a pump for circulating the liquid, and draws it from tank L by suction pipe N, and discharges it by pipe O into the top of the hollow frame J H. The circulation should be such that the hollow frame always remains full of liquid during the welding operation. When the heating has been accomplished the pump is stopped and the liquid empties from the hollow frame by gravity. The contracted discharge orifice from the vessel H insures the hollow frame remaining full during the operation of welding. The vessels J and H are provided with electrodes K of lead or other suitable metal, and there is connected by a circuit R with the positive pole of a continuous current generator P. The generator, may be of any suitable construction so long as it generates currents of constant polarity such as pulsating or intermittent currents. Such a generator may be provided with a rheostat $p$ for varying the current and voltage. The negative terminal of the generator $p$ is connected by circuit S with the rails, and by the carriage A with the two parts of the metal E F to be united. This negative terminal may be connected with the two parts of metal to be united in any other suitable manner desired. A double pole or any other suitable switch Q may be employed for interrupting the circuit when desired. It is quite evident however, that the circuit might be interrupted by simply stopping the pump M and thus breaking contact through the liquid.

The two parts I and G are so shaped as to make a tight joint and yet permit the ready insertion and removal of the rail; and, as before stated, they act as clamps or jaws for clamping each of the parts of the rail or metals to be united and thus bring them into direct mechanical and electrical connection with the negative terminal of the electric generator whereby the current is caused to divide and pass partly over each of the parts E and F, properly distributing the welding effects.

The support D for the foot F of the rail has its solenoid $d$ excited by a current in a shunt circuit $D^2$ upon bringing the carriage in position so that the contact $t$ is over the contact T on the railway, which latter is connected with the generator $p$ by a circuit S, and then closing the switch D'. It is not necessary to use the solenoid $d$ except when first putting the foot in position, after that is done the screw $f$ holds the parts F and E in position.

When the parts have been properly welded or brought to a welding heat, a suitable hydraulic or other crane U (shown in Fig. 2)

may be employed to lift the upper vessel J, I, from off the rail after the liquid has been lowered in the manner before described. The carriage A is then moved along so as to bring another foot into position for the electric welder, and at the same time bring the parts which have been electrically heated to a welding heat under the hammer or compressor W which is provided with suitably shaped jaws adapted to properly compress or forge the joint between the parts F and E of the rail as is clearly shown in Fig. 3. The arrow in Fig. 2 indicates the direction of the travel of the carriage A and the rail during these operations.

It will be understood that the particular details of the various parts may be modified or changed to suit the particular uses to which the invention may be put, the changes necessary to adapt the invention to other uses being those capable of being made by any one skilled in the art to which this invention pertains.

In this application I do not claim the process or method of welding herein set out as that forms subject matter of another pending application, Serial No. 487,951, filed October 12, 1893.

Having now described my invention, what I claim as new, and desire to secure by Letters Patent, is—

1. In apparatus for electric welding, the combination of holding devices for holding two pieces of metal to be united, a divided hollow frame open at top and bottom to contain a conducting fluid in which the parts to be united are submerged, and adapted to permit the parts to be welded to project into the interior, one or more electrodes within the hollow frame in electrical connection with the fluid, and a source of electrical energy having one of its poles connected with the electrode or electrodes and its other pole electrically connected with both of the pieces of metal to be united.

2. In apparatus for electric welding, the combination of holding devices for holding two pieces of metal to be united, a divided hollow frame to contain a conducting fluid in which the parts to be united are submerged, and adapted to permit the parts to be welded to project into the interior, one or more electrodes within the hollow frame in electrical connection with the fluid, a source of electrical energy having one of its poles connected with the electrode or electrodes and its other pole electrically connected with both of the pieces of metal to be united, and means to circulate the liquid through the hollow frame.

3. In apparatus for electric welding, the combination of holding devices for holding two pieces of metal to be united, a hollow frame open at top and bottom to contain a conducting fluid in which the parts to be united are submerged, one or more electrodes within the hollow frame in electrical connection with the fluid, and a continuous current generator having one of its poles connected with the electrode or electrodes and its other pole electrically connected with both of the pieces of metal to be united, and a pump to circulate the fluid through the hollow frame.

4. In an apparatus for electric welding, the combination of holding devices for holding two pieces of metal to be united, a divided hollow frame open at top and bottom to sustain a circulating conducting fluid in which the parts to be united are submerged, and adapted to permit the parts to be welded to project into the interior, one or more electrodes within the hollow frame in electrical connection with the fluid, a continuous current generator having its positive pole electrically connected with the electrode or electrodes and its negative pole electrically connected with both of the pieces of metal to be united, and means to maintain a supply of fluid in the hollow frame.

5. In an apparatus for electric welding, the combination of holding devices for holding two pieces of metal to be united, a hollow frame to sustain a conducting fluid in which the parts to be united are submerged, one or more electrodes within the hollow frame in electrical connection with the fluid, a source of electrical energy having one of its poles electrically connected with the electrode or electrodes and its other pole electrically connected with the two pieces of metal to be united, means to maintain a supply of fluid in the hollow frame, conveying devices adapted to move the metallic parts transversely to the hollow frame, and compression devices arranged near the hollow frame and in the path of the conveying devices whereby the metal parts after being heated may be immediately subjected to the compression devices.

6. In apparatus for electric welding, the combination of holding devices for holding two pieces of metal to be united, a hollow frame open above and below the parts to be united to sustain a conducting fluid in which the parts to be united are submerged, one or more electrodes within the hollow frame in electrical connection with the fluid, a source of electrical energy having one of its poles electrically connected with the electrode or electrodes and its other pole electrically connected with both of the pieces of metal to be united, means to circulate the fluid through the hollow frame, conveying devices adapted to move the metallic parts transversely to the hollow frame, and compression devices arranged near the hollow frame and in the path of the conveying devices whereby the metal parts after being heated may be immediately subjected to the compression devices.

7. In apparatus for electric welding, the combination of holding devices for holding two pieces of metal to be united, a hollow frame to sustain a conducting fluid in which the parts to be united are submerged, one or more electrodes within the hollow frame in electrical connection with the fluid, a continuous current generator having one of its poles connected with the electrode or electrodes and its other pole electrically connected with both of the pieces of metal to be united, means to circulate the fluid through the hollow frame, conveying devices adapted to move the metallic parts transversely to the hollow frame, and compression devices arranged near the hollow frame and in the path of the conveying devices whereby the metal parts after being heated may be immediately subjected to the compression devices.

8. In apparatus for electric welding, the combination of holding devices for holding two pieces of metal to be united, a hollow frame to sustain a solid column of conducting fluid in which the parts to be united are wholly submerged, one or more electrodes within the hollow frame in electrical connection with the liquid, a continuous current generator having one of its poles connected with the electrode and its other pole electrically connected with both of the pieces of metal to be united, and means to circulate the liquid through the hollow frame in a solid column in one direction.

9. In apparatus for electric welding, the combination of a hollow frame made in parts both of which are open at top and bottom and adapted to fit together and clamp between them two parts of metal to be united, a conducting fluid sustained within the hollow frame, one or more electrodes within the hollow frame in contact with the fluid at a distance from the line of separation of the two parts of the hollow frame, and a source of electrical energy having one of its poles connected with the electrode or electrodes and its other pole in electrical connection with the two parts of the metal to be united.

10. In apparatus for electric welding, the combination of a hollow frame made in parts both of which are open at top and bottom and adapted to fit together and clamp between them two parts of metal to be united, a conducting fluid sustained within the hollow frame, one or more electrodes within the hollow frame in contact with the fluid at a distance from the line of separation of the two parts of the hollow frame, and a continuous current generator having its positive pole electrically connected with the electrode or electrodes and its negative pole electrically connected with the two parts of the metal to be united.

11. In apparatus for electric welding, the combination of a hollow frame open at top and bottom and made in parts adapted to fit together and clamp between them two parts of metal to be united, a conducting fluid sustained within the hollow frame, one or more electrodes in contact with the fluid at a distance from the line of separation of the two parts of the hollow frame, a source of electrical energy having one of its poles connected with the electrode or electrodes and its other pole connected with the two parts of the metal to be united, and a liquid tight packing between the parts of the hollow frame and the metal parts to be united.

12. In apparatus for electric welding, the combination of a hollow frame open at top and bottom and made in parts adapted to fit together and clamp between them two parts of metal to be united, a conducting fluid sustained within the hollow frame, one or more electrodes in contact with the fluid at a distance from the line of separation of the two parts of the hollow frame, a source of electrical energy having one of its poles connected with the electrode or electrodes and its other pole connected with the two parts of the metal to be united, means to circulate the fluid during the welding operation, a continuous current generator having its positive pole connected with the electrode or electrodes and its negative pole electrically connected with the two parts of the metal to be united, and a liquid tight packing between the parts of the hollow frame and the metal parts to be united.

13. In apparatus for electric welding, the combination of a hollow frame open at top and bottom and made in parts adapted to fit together and clamp between them two parts of metal to be united, a conducting fluid sustained within the hollow frame, one or more electrodes in contact with the fluid at a distance from the line of separation of the two parts of the hollow frame, of a source electrical energy having one of its poles connected with the electrode or electrodes and its other pole connected with the two parts of the metal to be united, and means to circulate the fluid through the hollow frame.

14. In apparatus for electric welding, the combination of a support adapted to hold two parts of metal to be united in contact with each other, a hollow frame made in sections and adapted to inclose the joint between the two parts to be united, an electrode arranged within the hollow frame, a conducting fluid, means to circulate the conducting fluid in one direction through the hollow frame, a source of electrical energy having one pole connected with the electrode and the other pole electrically connected with the two parts of metal to be united, a railway, and a carriage upon the railway adapted to sustain the support for the metal parts whereby the metal parts may be moved relatively to the hollow frame.

15. In apparatus for electric welding, the combination of devices adapted to hold two parts of metal to be united in contact with each other, a hollow frame made in sections and adapted to inclose the joint between the two parts to be united, an electrode arranged within the hollow frame, a conducting fluid, a source of electrical energy having one pole connected with the electrode and the other pole electrically connected with the two parts of metal to be united, a railway, a carriage upon the railway adapted to sustain the devices for holding the metal parts whereby the metal parts may be moved relatively to the hollow frame, and means for circulating the liquid through the hollow frame in one direction.

16. In apparatus for electric welding, the combination of a carriage having devices adapted to hold two parts of metal to be united in contact with each other, a hollow frame open at top and bottom and made in sections and adapted to inclose the joint between the two parts to be united, an electrode arranged within the hollow frame, a conducting fluid also contained within the hollow frame, means to circulate the fluid through the hollow frame during the welding operation, a source of electrical energy having one pole connected with the electrode and the other pole electrically connected with the two parts of metal to be united, a railway upon which the carriage travels, and a compression device for compressing the welded joint arranged adjacent to the hollow frame and in the line of travel of the carriage.

In testimony of which invention I have hereunto set my hand.

R. M. HUNTER.

Witnesses:
ERNEST HOWARD HUNTER,
H. L. JACKSON.